(12) United States Patent
Toukura et al.

(10) Patent No.: US 6,269,296 B1
(45) Date of Patent: Jul. 31, 2001

(54) CONTROL OF VEHICLE DRIVING FORCE

(75) Inventors: Nobusuke Toukura; Hiroshi Abe; Masaaki Uchida, all of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/352,766

(22) Filed: Jul. 14, 1999

(30) Foreign Application Priority Data

Jul. 15, 1998 (JP) .................................................. 10-199888

(51) Int. Cl.$^7$ ....................................................... B60T 8/58
(52) U.S. Cl. ................................ 701/80; 701/95; 701/96; 701/65
(58) Field of Search .................................. 701/95, 54, 65, 701/70, 94, 111, 84, 96, 80

(56) References Cited

U.S. PATENT DOCUMENTS 4,285,252  8/1981  Yamaki et al. ........................ 74/866
5,752,214 * 5/1998  Minowa et al. ..................... 701/111

FOREIGN PATENT DOCUMENTS 59-8698   2/1984  (JP) .
8-219242  8/1996  (JP) .

* cited by examiner

*Primary Examiner*—William A. Cuchlinski, Jr.
*Assistant Examiner*—Arthur D. Donnelly
(74) *Attorney, Agent, or Firm*—Foley & Lardner (57) ABSTRACT

A vehicle driving force control apparatus includes an element for calculating a normal target driving force representing a desired vehicle driving force on a level road in accordance with sensed accelerator input quantity and vehicle speed, an element for calculating a modification quantity in accordance with a vehicle grade resistance, an element for determining a grade-adapted target driving force in accordance with the normal driving force and the modification quantity. The grade-adapted target driving force is achieved in a vehicle to provide adequate feeling of acceleration even on an ascending slope.

17 Claims, 9 Drawing Sheets

$$\text{GRADE } \Theta = \left(\frac{d-b+c-a}{2L}\right) \times \cos\xi + \left(\frac{a-b+c-d}{2L}\right) \times \sin\xi$$

CONTROL OF VEHICLE DRIVING FORCE

BACKGROUND OF THE INVENTION

The present invention relates to vehicle driving force control systems and methods.

Japanese Patent Kokoku (post-examination) Publication No. 59(1984)-8698 and Japanese Patent Kokai Publication No. 8(1996)-219242 show systems for adapting a driving performance to a grade or slope of a road by adjusting the characteristic of a transmission.

SUMMARY OF THE INVENTION

It is an object of the present invention to provide apparatus and method for providing adequate acceleration adapted to the road grade with less cost and less complication.

The system of the above-mentioned Japanese Publication No. 8(1996)-219242 tries to maintain acceleration on an ascending slope by continuously modifying a transmission ratio in accordance with the slope of a road. However, the control of the transmission ratio can not always produce a driving force matching driver's expectation, so that the driver may feel excess or deficiency in acceleration.

The system of the above-mentioned Japanese Publication No. 59(1984)-8698 switches shift maps to maintain acceleration on an ascending slope. However, the adaptation of one or more shift maps to uphill slopes of various grades tends to increase the required memory capacity and manhour.

According to the present invention, an apparatus for controlling a vehicle driving force comprises: an input section for sensing a driver's accelerator input quantity and a vehicle speed of a vehicle; an output section for varying an actual vehicle driving force; and a control section connected with said input section to receive input information therefrom, to determine, as a normal target driving force, a desired vehicle driving force on a level road in accordance with the accelerator input quantity and the vehicle speed, further to determine a vehicle grade resistance, to calculate a modification parameter in accordance with the vehicle grade resistance, and to determine a grade-adapted target driving force in accordance with the normal driving force and the modification parameter, the controller being further connected with said output section to achieve the grade-adapted target driving force with the output section.

According to another aspect of the present invention, a vehicle comprises: an output section comprising a prime mover such as an engine; an input section for collecting input information on vehicle operating conditions; and a control section comprising a controller for determining a normal target driving force, for determining a vehicle grade resistance, for calculating a driving force modification quantity in accordance with the vehicle grade resistance, for determining a grade-adapted target driving force from the driving force modification quantity and the normal driving force, and for achieving the grade-adapted target driving force by controlling the output section.

A vehicle driving force controlling apparatus according to the present invention may comprise first means for ascertaining an accelerator input quantity or accelerator operation quantity and a vehicle speed; second means for determining, as a normal target driving force, a desired vehicle driving force on a level road in accordance with the accelerator input quantity and the vehicle speed; third means for determining a vehicle grade resistance; fourth means for calculating a driving force modification quantity in accordance with the grade resistance; fifth means for determining a grade-adapted target driving force which is a sum of the normal driving force and the driving force modification driving; and sixth means for achieving the grade-adapted target driving force. According to the present invention, a process for controlling a vehicle driving force of a vehicle, comprises: determining a normal driving force representing a desired vehicle driving force on a level road; calculating a driving force modification quantity in accordance with a vehicle grade resistance; and determining a grade-adapted target driving force which is a sum of the normal driving force and the driving force modification quantity, to control the vehicle driving force.

DETAILED DESCRIPTION OF THE INVENTION

Figure 1:
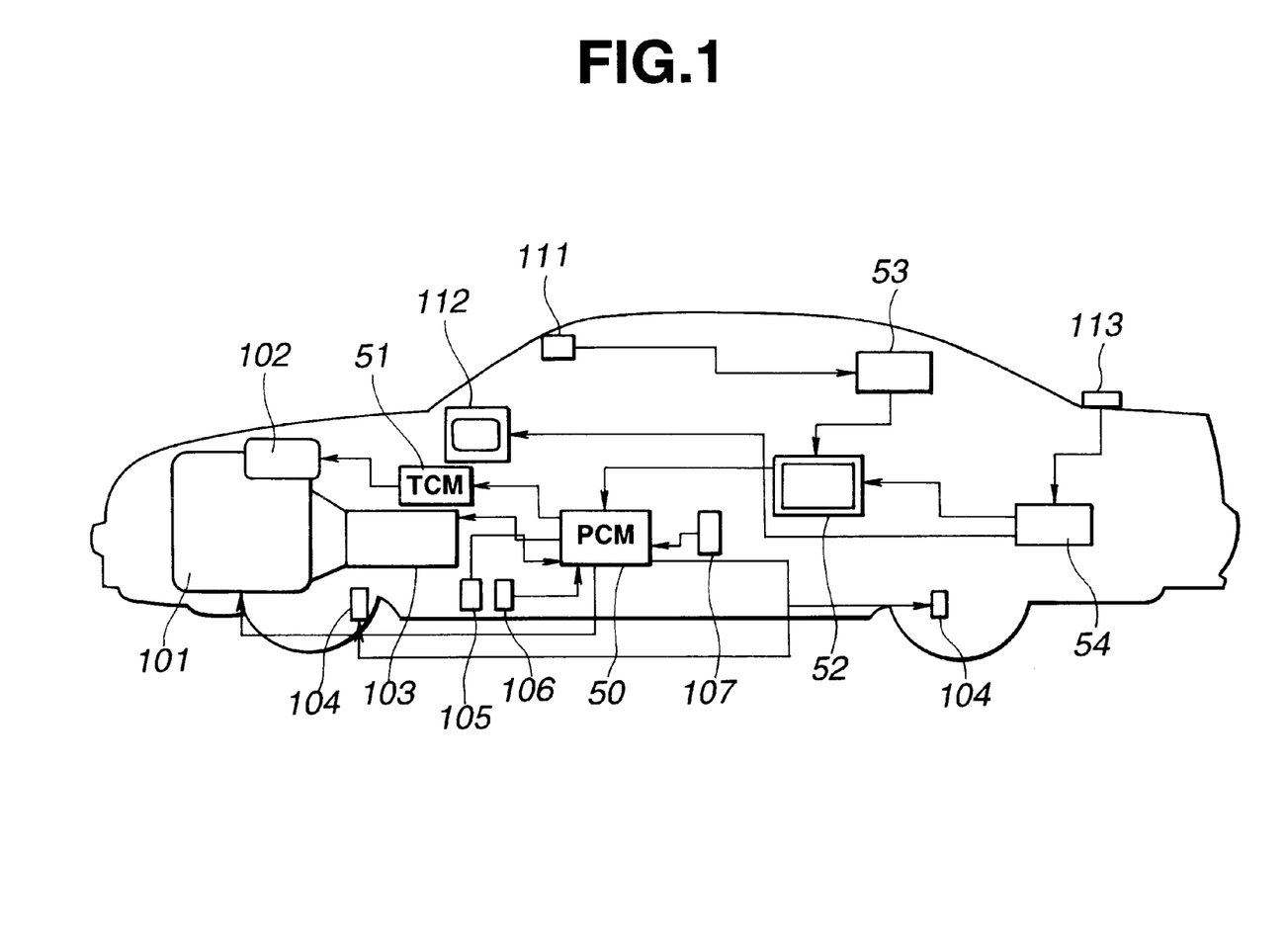
FIG. 1 is a schematic view showing a vehicle equipped with a control system according to the present invention.

FIG. 1 shows a motor vehicle equipped with a control system according to the present invention.

The output power of an engine 101 is delivered to drive wheels, through an automatic transmission 103 having a torque converter therein. The automatic transmission 103 of this example has a planetary gear system and clutches. Instead of such a multi-speed automatic transmission, it is optional in the present invention to employ a continuously variable transmission such as a V belt type CVT or a toroidal type CVT.

An electronic throttle control actuator 102 has a motor, and electronically controls a throttle valve disposed in the intake air passage of the engine 101, with the motor. With the throttle control actuator 102, this control system can vary the intake air quantity for the engine 101 by varying the opening of the throttle valve, and thereby control the engine output torque.

A throttle control module (TCM) 51 drives the electronic throttle actuator 102. The TCM 51 receives a throttle opening command signal representing a command throttle opening (degree) from a power train control module (PCM) 50, converts the throttle opening command to a motor drive voltage, and delivers the motor drive voltage to the motor of the electronic throttle control actuator 102. In this example, the TCM 51 feedback-controls the motor drive voltage (corresponding to the throttle opening degree) so as to reduce a deviation of the actual throttle opening (degree) from the command throttle opening directed by the PCM 50.

The power train control module (PCM) 50 receives an accelerator input or operation quantity signal from an accelerator sensor 105, a brake operation signal from a brake operation switch 106, and a selected range signal from a range selector lever 107 for the automatic transmission 103. The accelerator (position) sensor 105 of this example senses an accelerator input quantity which, in this example, is the depression degree of the accelerator pedal indicative of a driver's accelerator input or demand, and produces the accelerator input quantity signal. In accordance with these input signals, the PCM 50 performs engine control (to control one or more engine operating parameters such as the fuel supply quantity and the ignition timing for the engine 101), transmission control (to control the gear position or speed ratio and an oil pressure for the automatic transmission 103) and braking force control (to control a brake fluid pressure for a brake actuator 104 of each wheel).

A camera 111 forms imagery of a headway situation ahead of the vehicle. An image processor 53 receives the picture signal from the camera 111, and processes the picture signal to detect headway road conditions, vehicle conditions and obstacle conditions. The results of the image processing are sent to an external environment information processing module 52.

A GPS (global positioning system) antenna 113 receives signals from satellites, and supplies information from the satellites, to a position information processor 54 to determine the current position of the vehicle. From map information including geographical attributes and road information stored in a record medium such as CD-ROM, and the satellite information supplied from the GPS antenna 113, the position information processor 54 collects information on a region around the current vehicle position, and supplies the collected information to the external environment information processing module 52.

The external environment information processing module 52 prepares pertinent information on the environment and supplies the information to the PCM 50. In response to this, the PCM 50 controls the output of the engine 101 and the gear ratio or speed ratio of the automatic transmission 103. Conversely, the PCM 50 sends, to the environment module 52, information on the output torque of the engine 101, the gear position of the automatic transmission 103, the accelerator condition sensed by the accelerator opening sensor 105, and the brake condition sensed by the brake operation switch 106. The environment module 52 can use the information supplied from the PCM 50 to improve the accuracy in recognizing the external environment, and to infer driver's mental state.

In a first embodiment of the present invention, the control system preliminarily determines, as a normal target driving force, such a desired driving force on a level road as to provide a satisfied feeling of acceleration to a driver on a level road, and modifies the normal driving force so as to provide a comparable satisfied feeling of acceleration even on an uphill road.

Figure 2:
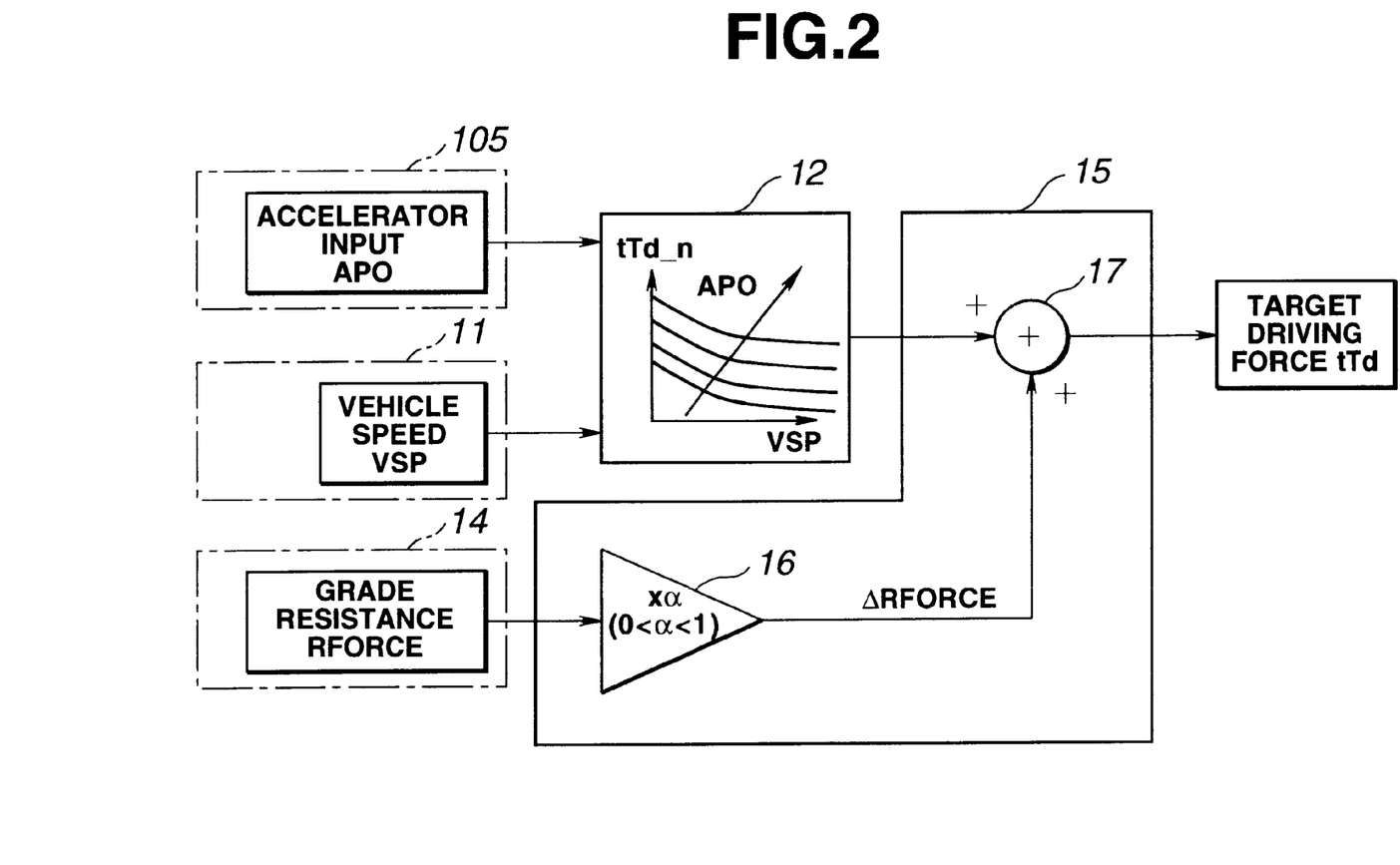
FIG. 2 is a block diagram showing operations performed in a PCM 50 shown in FIG. 1.

This control is performed in the PCM 50, as shown in FIG. 2. The PCM 50 can serve as a controller of this control system. The PCM 50 of this example includes, as a main component, a computer mounted on the vehicle.

A normal target driving force setting section 12 receives the accelerator input quantity APO from the accelerator sensor 105 and the vehicle speed VSP from a vehicle speed sensor 11. In accordance with these input information items, the normal target driving force setting section 12 determines a desired vehicle driving force value in a level road driving situation, and sets this desired vehicle driving force as a normal target driving force tTd__n.

A modifying section (or grade-adapted target driving force calculating section) 15 is a section for calculating a grade-adapted target driving force tTd by modifying the normal target driving force tTd__n with a parameter representing a vehicle weight grade resistance. The modifying section 15 of this example includes a driving force modification quantity calculating subsection 16 (in the form of a multiplier) and a driving force modifying subsection (or grade-adapted target driving force determining subsection) 17 (in the form of an adder).

The modifying section 15 is connected with a weight grade resistance sensing section 14 for sensing a vehicle weight grade resistance RFORCE. The modification quantity calculating subsection 16 receives the vehicle grade resistance RFORCE from the grade resistance sensing section 14, and determines a driving force modification quantity $\Delta$RFORCE ($=\alpha \times$RFORCE) by multiplying the grade resistance RFORCE by a grade resistance coefficient $\alpha$ (where $0<\alpha<1$). The driving force modifying subsection 17 adds the driving force modification quantity $\Delta$RFORCE supplied from the modification quantity calculating subsection 16, to the normal target driving force tTd__n supplied from the normal target driving force setting section 12, and thereby determines the grade-adapted target driving force tTd ($=$Td__n $+\Delta$RFORCE).

Figure 3:
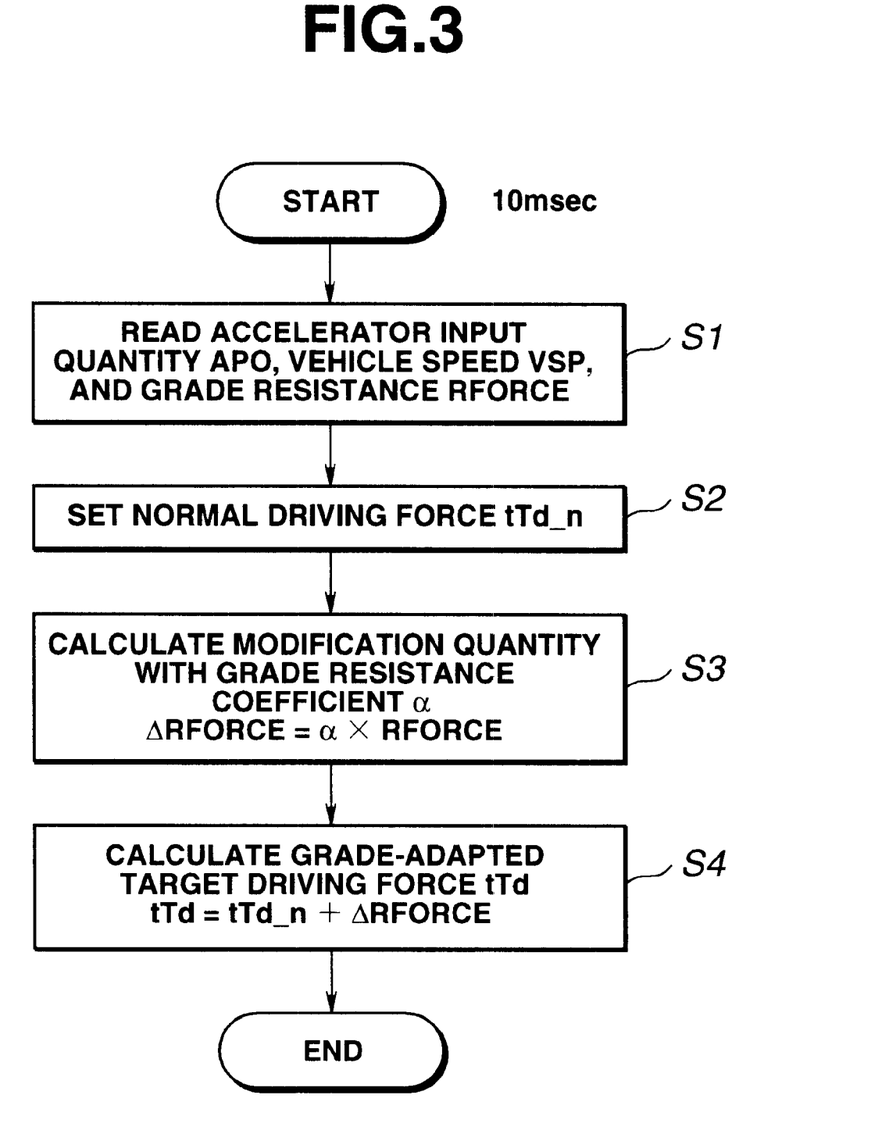
FIG. 3 is a flowchart corresponding to the block diagram of FIG. 2.

FIG. 3 shows a flowchart corresponding to the block diagram of FIG. 2. In this example, the procedure of FIG. 3 is executed at regular time intervals of 10msec.

At a step S1, the controller reads the accelerator input quantity APO, the vehicle speed VSP and the grade resistance RFORCE. Then, at a step S2, the controller determines the normal target driving force tTd__n in accordance with the accelerator input quantity APO and the vehicle speed VSP. The normal target driving force tTd__n is a desired driving force for driving on a level road. The step S1 corresponds to means for ascertaining the accelerator input quantity and the vehicle speed. The step S2 corresponds to means for determining the normal target driving force.

At a step S3, the controller determines the driving force modification quantity $\Delta$RFORCE ($=\alpha \times$RFORCE) by multiplying the grade resistance RFORCE by the grade resistance coefficient a ($0<\alpha<1$). At a next step S4, the controller determines the grade-adapted target driving force tTd ($=$tTd__n $+\Delta$RFORCE) by adding the driving force modification quantity $\Delta$RFORCE to the normal target driving force tTd__n. The step S3 corresponds to means for calculating the driving force modification quantity, and the step S4 to means for determining the grade-adapted target driving force.

By calculating the normal target driving force tTd__n to the driver's satisfaction for the level road driving and the driving force modification quantity $\Delta$RFORCE for the uphill driving, the driving force control system according to the first embodiment can always provide an agreeable feeling of acceleration both on a level road and an uphill road.

The conversion from the normal target driving force to the grade-adapted target driving force is done simply by using the grade resistance coefficient $\alpha$. The first embodiment does not require additional maps such as a map of high output mode adapted to an uphill grade. Therefore, the required capacity of a memory such as ROM is small. Moreover, the tuning of a characteristic can be readily performed by adjustment of the grade resistance coefficient $\alpha$.

Figure 4:
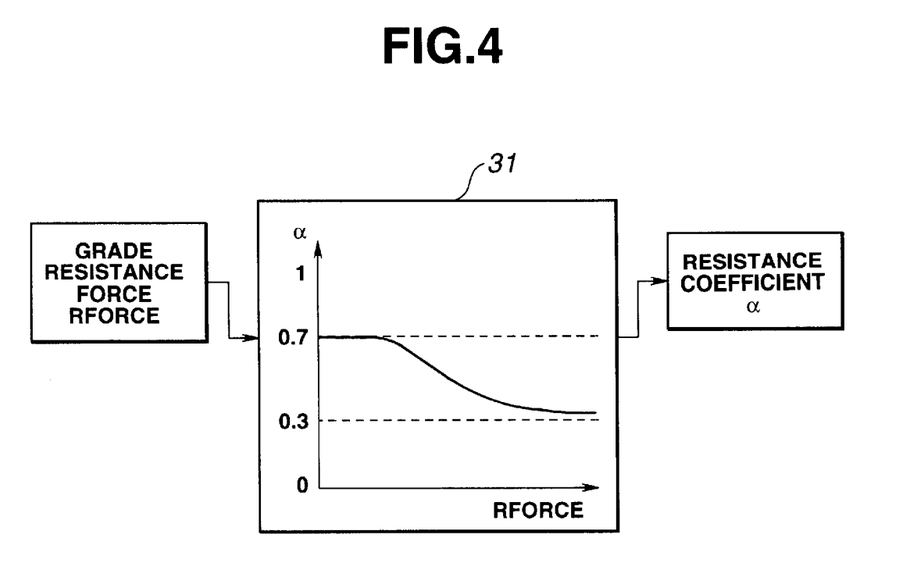
FIG. 4 is a block diagram for showing a second embodiment of the present invention.

FIG. 4 shows a grade resistance coefficient calculating section 31 according to a second embodiment of the present invention.

In the first embodiment, the grade resistance coefficient a is constant. With the grade resistance coefficient calculating section 31, the control system according to the second embodiment is arranged to vary the grade resistance coefficient a in accordance with the grade resistance RFORCE. The grade resistance coefficient $\alpha$ is a function of the grade resistance RFORCE. As shown in FIG. 4, the grade resistance coefficient a of this example decreases monotonically as the grade resistance RFORCE increases.

In the second embodiment, attention is paid to the driver's tendency of recognizing the grade. When the grade resistance is higher, the driver tends to recognize the grade more clearly. In the case of a gradual slope, the driver tends to be unaware of the slope and unmotivated to depress the accelerator pedal deeper. Therefore, a greater percentage of the driving force modification quantity with respect to the grade resistance is adequate to prevent insufficiency in acceleration. When the slope is steeper, the driver recognizes the slope and consciously depresses the accelerator pedal harder, so that a smaller percentage of the driving force modification quantity suffices. Therefore, by using the grade resistance coefficient a designed to decrease the proportion of the driving force modification quantity in relation to the grade resistance with increase in the grade resistance, the control system of the second embodiment can always provide a natural feeling of acceleration irrespective of the slope.

In this example, the grade resistance coefficient a is varied within the range of 30% ~70%. The range from 30% to 70% is preferable to the adequate driving force assist to provide a natural feeling of acceleration without deficiency and excess of acceleration in the hill climbing operation.

Figure 5:
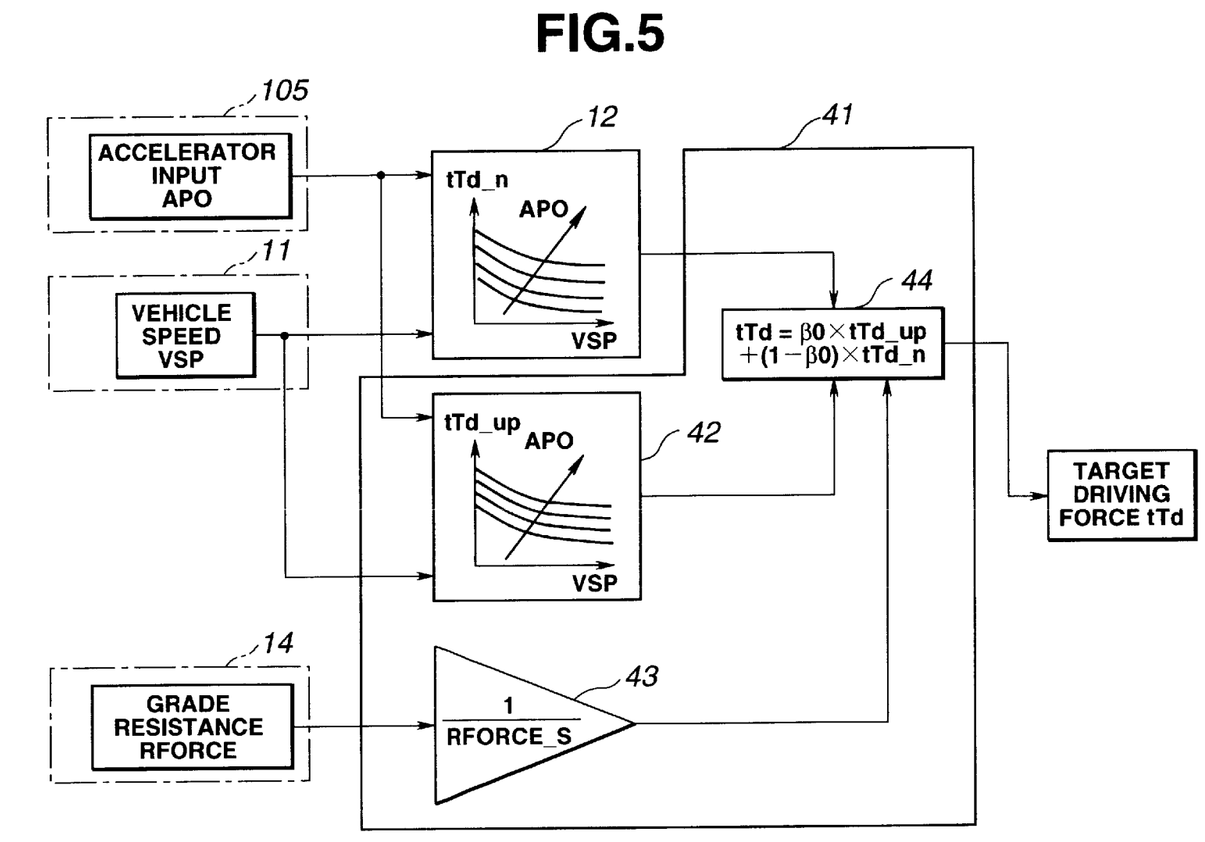
FIG. 5 is a block diagram showing operations performed in the PCM 50 according to a third embodiment.
Figure 6:
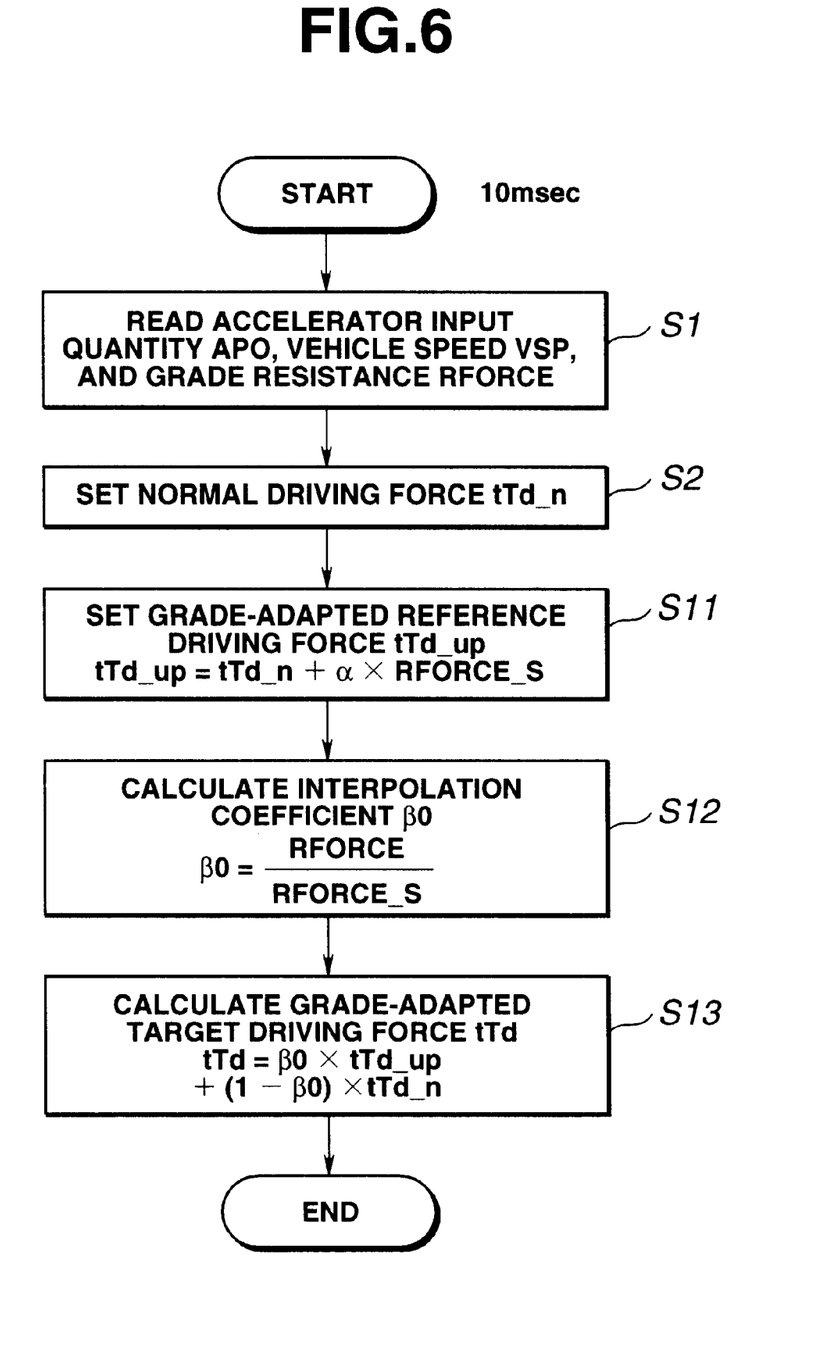
FIG. 6 is a flowchart corresponding to the block diagram of FIG. 5.

FIGS. 5 and 6 show a driving force control system according to a third embodiment. The control system shown in FIG. 5 includes components substantially identical per se to the corresponding components shown in FIG. 2. The same reference numerals are used to denote the identical components in FIGS. 2 and 5. The steps S1 and S2 of FIG. 6 are substantially identical to the steps S1 and S2 of FIG. 3.

The control system of FIG. 5 is almost the same as the system of FIG. 2, but differs in a modifying section (or grade-adapted target driving force calculating section) 41.

The modifying section 41 of FIG. 5 includes a grade-adapted reference driving force setting section 42, a dividing section (or interpolation coefficient calculating section) 43 and a grade-adapted target driving force calculating (or interpolating) section 44.

The grade-adapted reference driving force setting section 42 calculates a grade-adapted reference driving force tTd-up in accordance with the accelerator input quantity APO and the vehicle speed VSP by information retrieval from a predetermined map. The grade-adapted reference driving force tTd_up is equal to a sum of the normal driving force tTd_n and a predetermined percent of a predetermined standard grade resistance RFORCE_S of a non-level road. The predetermined percent is smaller than 100%. The grade-adapted reference driving force tTd_up is given by:

$$tTd\_up=tTd\_n+\alpha \times RFORCE\_S \quad \text{[Mathematical Expression 1]}$$

The dividing section (or interpolation coefficient calculating section) 43 calculates an interpolation coefficient β0 (dimensionless number) by diving the sensed vehicle grade resistance RFORCE by the standard grade resistance RFORCE_S.

$$\beta 0=RFORCE/RFORCE\_S \quad \text{[Mathematical Expression 2]}$$

The grade-adapted target driving force calculating section 44 determines the grade-adapted target driving force tTd by using the following equation for interpolation with the interpolation coefficient β0.

$$tTd=\beta 0 \times tTd\_up+(1-\beta 0) \times tTd\_n \quad \text{[Mathematical Expression 3]}$$

When, for example, RFORCE =RFORCE_S, then β0 is equal to one (β0=1) as known from the equation 2, and tTd=tTd_up from the equation 3.

In the third embodiment utilizing the preset grade-adapted reference driving force tTd_up, it is easy to incorporate various requirements and constraints into the control system. For example, it is possible to set the grade-adapted reference driving force tTd_up so as not to exceed the output limit beyond which the output of the engine can not exceed because of its output torque characteristic. Moreover, by setting the grade-adapted reference driving force tTd_up at a level lower than the desired driving force in another drive range such as a sporty mode, it is possible to avoid unwanted acceleration or deceleration in changeover to the sporty mode. Alternatively, such a setting is possible as to always shift toward the acceleration side to the driver's expectation.

Figure 7:
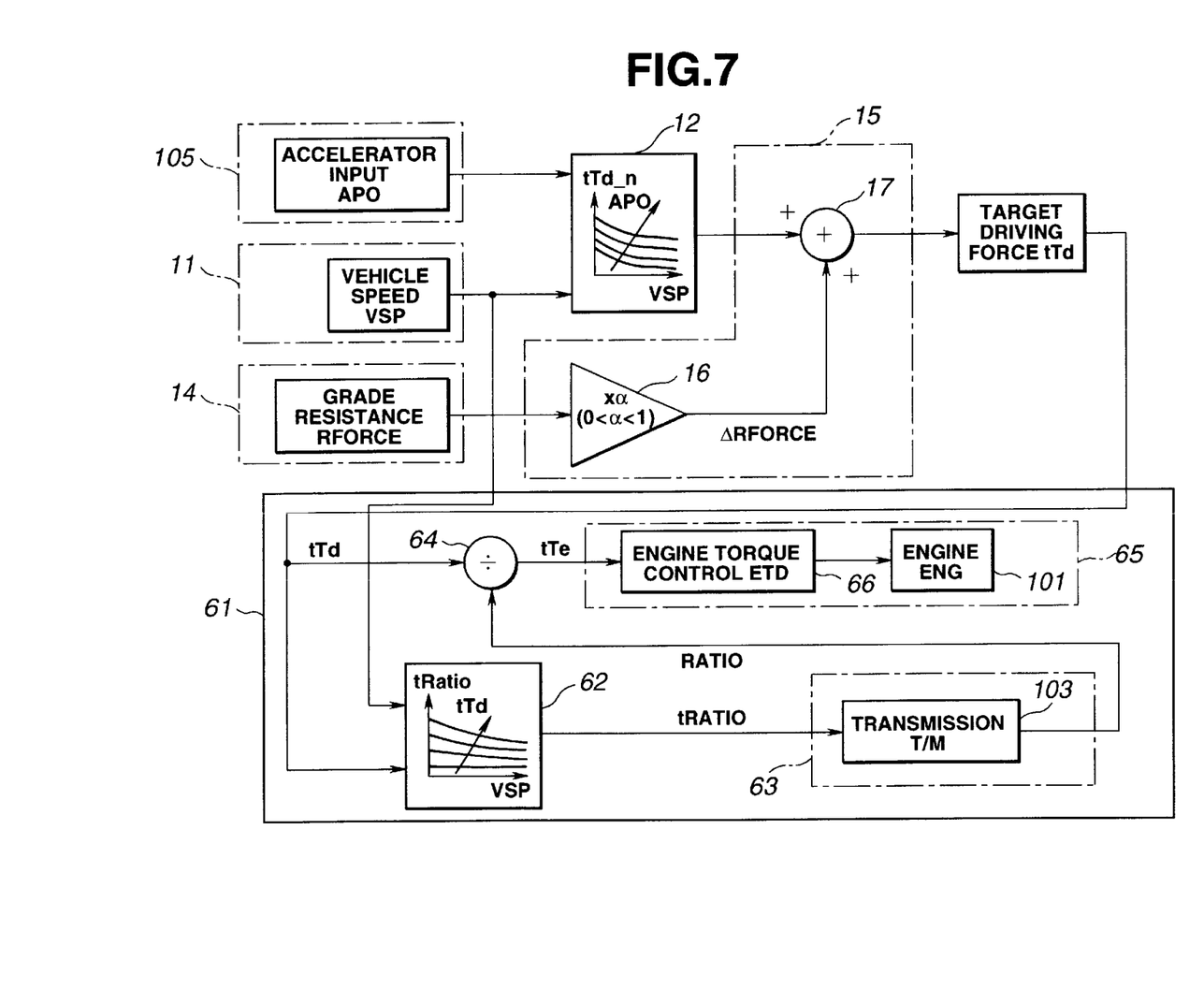
FIG. 7 is a block diagram showing operations performed in the PCM 50 according to a fourth embodiment.

FIG. 7 shows a fourth embodiment of the present invention. The system of FIG. 7 differs from FIG. 2 in addition of a target driving force achieving section 61.

The target driving force achieving section 61 of this example includes a transmission ratio controlling section 62, a transmission ratio achieving section 63, a target engine output torque calculating section 64 and an engine output torque achieving section 65.

The transmission ratio controlling section 62 receives the grade-adapted target driving force tTd and the vehicle speed VSP, and determines a target transmission ratio tRATIO (a target ratio between the input and output speeds) in accordance with tTd and VSP, by retrieval from a predetermined map. Instead of the retrieval from the map, the transmission ratio controlling section 62 can be designed to calculate the target transmission ratio tRATIO by first determining a target transmission input speed of the input shaft of the transmission which is often used in the transmission control, and then calculating the target transmission ratio from the relationship with the vehicle speed VSP.

The thus-determined target transmission ratio tRATIO is achieved by the transmission ratio achieving section 63.

The target engine output torque calculating section 64 calculates the target engine output torque tTe by dividing the grade-adapted target driving force tTd by a transmission ratio RATIO achieved by the transmission 103. The engine torque achieving section 65 of this example includes an engine torque controlling section 66 and the engine 101. The engine torque controlling section 66 controls the throttle opening, the fuel injection quantity and the ignition timing of the engine 101 to achieve the target engine torque tTe, by sending commands or control signals (representing a command throttle opening, a command fuel injection quantity and a command ignition timing) to the engine 101.

In achieving the grade-adapted target driving force, the achieving section 61 of FIG. 7 first determines the target transmission ratio tRATIO for the transmission 103 which is slower in response. Therefore, the control system can achieve the grade-adapted target driving force responsively.

Figure 8:
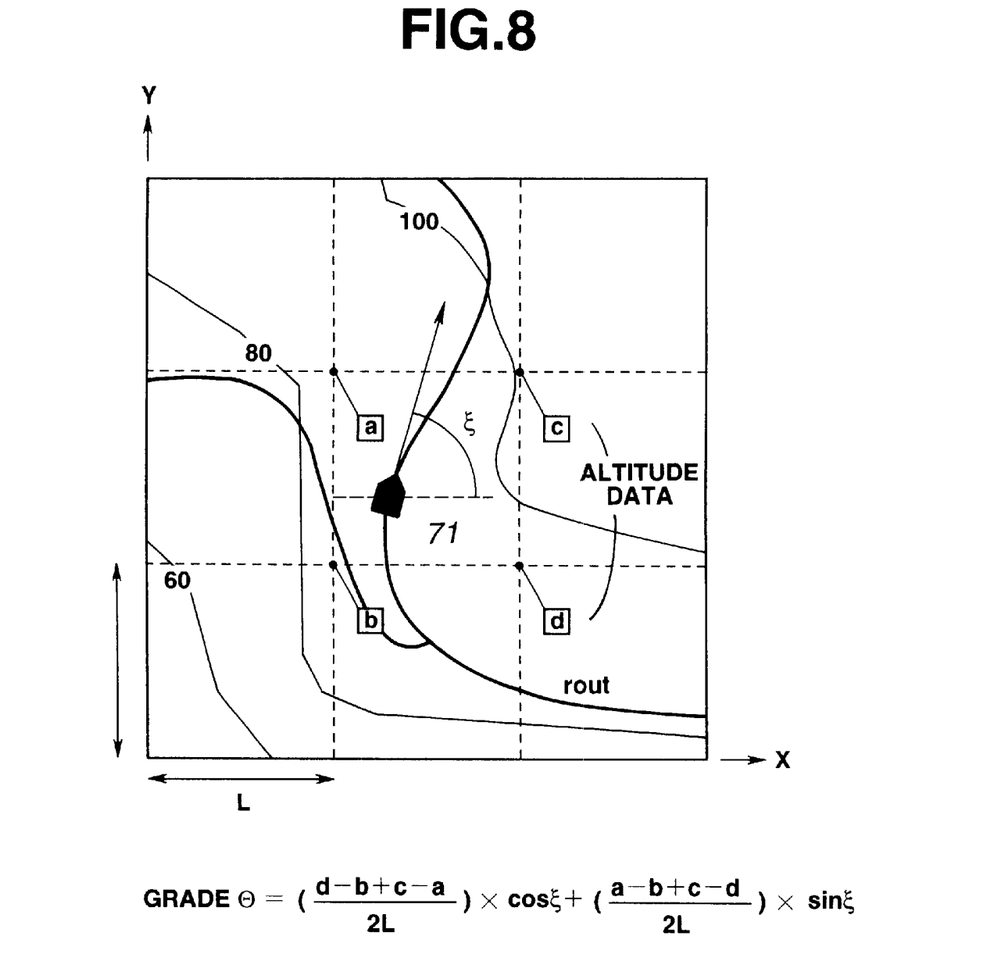
FIG. 8 is a view showing a road map used for estimation of a road grade according to a fifth embodiment.

FIG. 8 shows a road map for illustrating a process for estimating a road grade according to a fifth embodiment of the present invention. In the example of FIG. 8, the control system estimates the road grade at a current vehicle position 71. In the map of FIG. 8, a larger area is divided into small square sections by a grid of uniformly spaced vertical and horizontal grid lines. The map information includes altitude data on the altitude (or elevation) of each grid point (i.e., intersection point between one vertical line and one horizontal line) shown in FIG. 8 by a small black round mark. From the altitude data items (a, b, c, d) of the four grid points defining the section in which the current vehicle position 71 lies, the road grade at the current vehicle position 71 is calculated in the following manner.

The average grades along the X and Y directions (or horizontal and vertical directions) in that section are given by the following equations.

Average grade along the X direction =(d−b+c−a)/2L Average grade along the Y direction =
(a−b+c−d)/2L  [Mathematical Expression 4]

In these equations, L is an interval between grid lines. In this example, the heading direction of the vehicle forms an angle ξ with the X (horizontal) axis in the counterclockwise rotational direction, as shown in FIG. 8. The control system can determine the road grade Θ at the current vehicle position 71 by the following equation.

tanΘ={(d−b+c−a)/2L}×cosξ+
{(a−b+c−d)/2L}×sinξ  [Mathematical Expression 5]

From the road grade Θ, the vehicle weight grade resistance RFORCE is determined by using the following equation (cf., the before-mentioned Japanese Publication 8-219242).

RFORCE =m×g×sinΘ  [Mathematical Expression 6]

where m is the mass of the vehicle, and g is the gravitational acceleration.

In this practical example, altitude data is stored in relation to the grid on the map. The present invention is not limited to this structure. For estimation of the road grade or slope, the control system can use various other map data structures such as a map data system including altitude data stored in relation to points or segments of roads or a system including data on the slope of roads stored in relation to positions or segments of roads.

The control system according to the fifth embodiment is configured to estimate the road grade or slope at the vehicle position by using road map data and data from satellites on the absolute vehicle position. Therefore, the estimation is accurate and exempt from influence from changes in the vehicle driving force characteristics due to changes in vehicle operating conditions such as puncture and aging of tires.

The control system according to the fifth embodiment can accurately predict the slope of a road ahead of the vehicle, and provide more responsive driving force control with anticipating correction of the driving force. This control system can estimate the road grade without delay by avoiding a delay in calculation of the road grade from engine output, driving force and vehicle acceleration, and a delay in transmitting the driving force.

Figure 9:
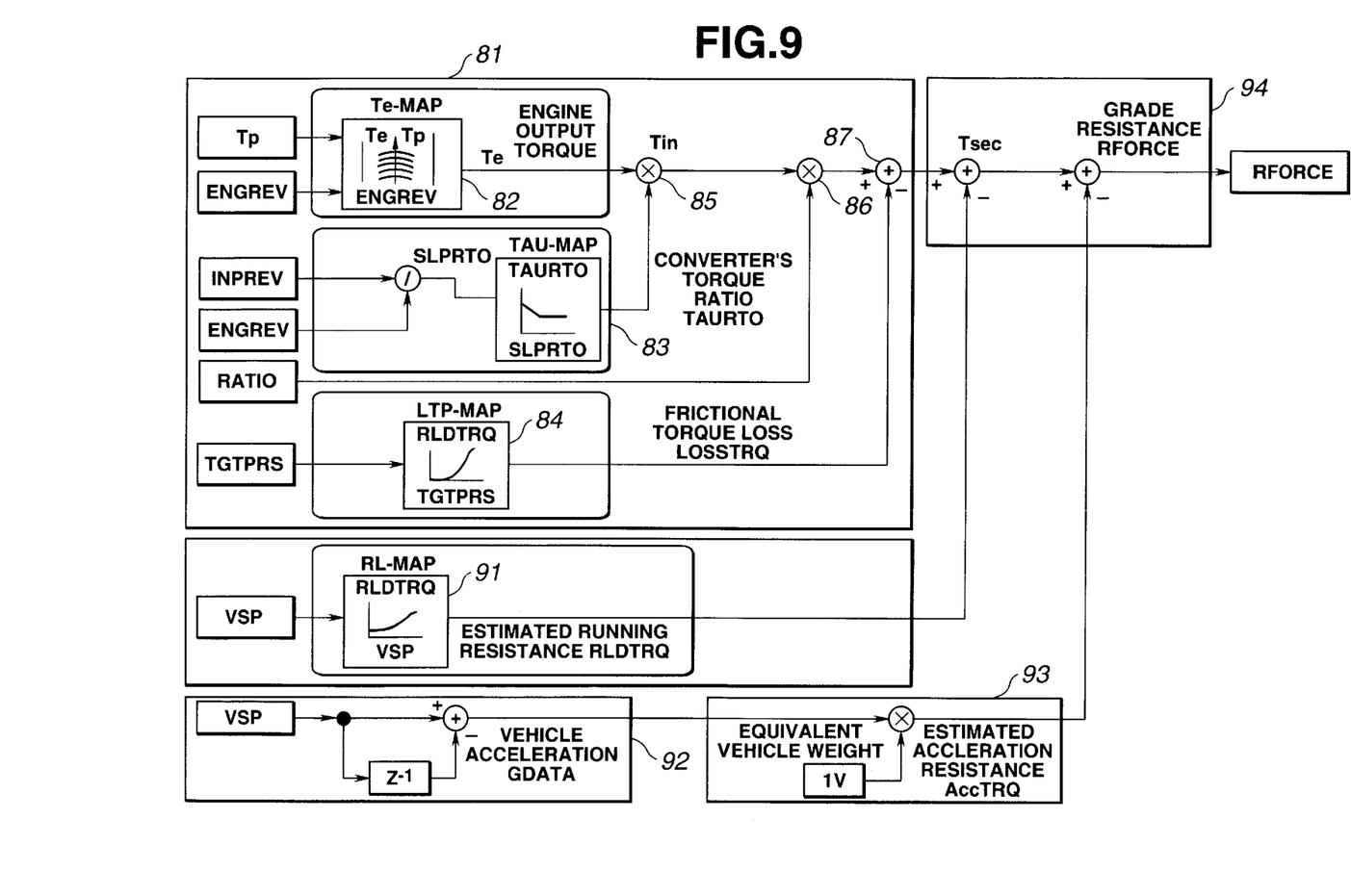
FIG. 9 is a block diagram for showing a sixth embodiment of the present invention.

FIG. 9 shows a grade resistance estimating system according to a sixth embodiment of the present invention, arranged to estimate the vehicle grade resistance by calculating a drive shaft turning force and taking account of a reference running resistance on a level road and acceleration resistance.

A drive shaft torque calculating section 81 includes as main components an engine output shaft torque calculating section 82, a torque converter's torque multiplication ratio calculating section 83, and a drive system torque loss estimating section 84.

The engine output shaft torque calculating section 82 determines an engine output shaft torque Te, by retrieval from a predetermined map, in accordance with a fuel injection quantity Tp and an engine revolution speed ENGREV of the engine 101.

The torque converter multiplication ratio calculating section 83 calculates a speed ratio SLPRTO between the engine revolution speed ENGREV and a transmission input shaft speed INPREV of the input shaft of the transmission (that is the output shaft speed of the torque converter), and determines, from this speed ratio SLPRTO, a torque converter's torque multiplication ratio (or multiplication factor) TAURTO by retrieval from a predetermined map.

The drive system torque loss estimating section 84 determines a loss torque LOSSTRQ (representing a frictional torque loss of the drive system) by retrieval from a predetermined map, from an operating oil pressure TGTPRS which is most influential in the torque loss in the drive system.

A multiplier 85 determines a primary shaft output torque Tin (=Te×TAURTO) by multiplying the engine output shaft torque Te by the torque multiplication ratio TAURTO. A multiplier 86 and an adder 87 combine to calculate an output shaft torque (or drive shaft torque) Tsec of the drive shaft according to the following equation.

Tsec =Tin ×RATIO −LOSSTRQ  [Mathematical Expression 7]

where RATIO is a speed ratio between the input and output speeds of the transmission.

A reference running resistance calculating section 91 determines, from the vehicle speed VSP, a reference running resistance RLDTRQ (a standard running resistance on a level road) by retrieval from a predetermined map.

An acceleration sensing section 92 determines a vehicle acceleration GDATA from a finite difference of the vehicle speed VSP. An acceleration resistance force estimating section 93 determines an estimated acceleration resistance AccTRQ on the output shaft by multiplying the vehicle acceleration GDATA by an equivalent vehicle weight Iv as viewed from the output shaft.

By using the drive shaft output torque Tsec, the reference running resistance RLDTRQ and the estimated acceleration resistance AccTRQ, a vehicle weight grade resistance estimating section 94 determines the vehicle weight grade resistance RFORCE according to the following equation.

RFORCE =
Tsec −RLDTRQ −AccTRQ  [Mathematical Expression 8]

Instead of the estimation of the vehicle acceleration from the vehicle speed, it is optional to employ an acceleration sensor for directing sensing the actual vehicle acceleration.

The estimation of the vehicle grade resistance according to the sixth embodiment is very uncostly without the need for a special sensor for sensing the grade resistance.

The grade resistance sensing section 14 shown in FIG. 2, 5 or 7 may comprise a vehicle inclination sensor for sensing an inclination angle of the vehicle.

An apparatus for controlling a vehicle driving force according to the present invention includes at least a controller (such as the PCM 50). The apparatus may be a control system inclusive of sensors and actuators.

In the third embodiment, it is possible to calculate, as a driving force modification quantity, a product of the interpolation coefficient (β0) and the difference resulting from subtraction of the normal driving force tTd_n from the grade-adapted reference driving force tTd_up, and to determine the grade-adapted target driving force by adding the modification quantity to the normal target driving force.

The control system shown in FIG. 7 includes an input section for collecting input information, a control section and an output section for varying an actual vehicle driving force in response to a control signal from the control section. The input section may be a part of a computer module for collecting input information, or may include one or more external sensors. In the example shown in FIG. 7, the output section can be construed as including at least one component of the section 61.

In the illustrated embodiments, the grade-adapted target driving force is determined in accordance with the normal driving force and a modification parameter such as ΔRFORCE or β0.

This application is based on a Japanese Patent Application No. 10(1998)-199888. The entire contents of this Japanese Patent Application with a filing date of Jul.15, 1998 are hereby incorporated by reference.

The invention is not limited to the embodiments described and illustrated above. Modifications and variations of the embodiments described above will occur to those skilled in the art in light of the above teachings. The scope of the invention is defined with reference to the following claims.

What is claimed is:

1. An apparatus for controlling a vehicle driving force comprising:

an input section for sensing a driver's accelerator input quantity and a vehicle speed of a vehicle;

an output section for varying an actual vehicle driving force; and a control section connected with said input section to receive input information therefrom, to determine, as a normal target driving force, a desired vehicle driving force on a level road in accordance with the accelerator input quantity and the vehicle speed, further to determine a vehicle grade resistance, to calculate a modification parameter in accordance with the vehicle grade resistance, and to determine a grade-adapted target driving force in accordance with the normal driving force and the modification parameter, the controller being further connected with said output section to achieve the grade-adapted target driving force with the output section;

wherein the input section comprises an accelerator input quantity sensing section for sensing the accelerator input quantity, and a vehicle speed sensing section for sensing the vehicle speed; and wherein the control section comprises a normal driving force determining section for determining, as the normal driving force, the desired vehicle driving force on the level road in accordance with the accelerator input quantity and the vehicle speed, a vehicle weight grade resistance determining section for determining the vehicle grade resistance, a modification parameter calculating section for calculating the modification parameter in accordance with the grade resistance, and a grade-adapted target driving force calculating section for determining the grade-adapted target driving force in accordance with the normal driving force and the modification parameter;

wherein the modification parameter calculating section comprises a modification quantity calculating section for calculating a driving force modification quantity which is set at a predetermined percent of the grade resistance, the predetermined percent being smaller than 100%; and wherein the grade-adapted target driving force calculating section determines the grade-adapted target driving force by adding the driving force modification quantity to the normal driving force.

2. The vehicle driving force control apparatus as recited in claim 1 wherein the predetermined percent is in the range of 30%~70%.

3. The vehicle driving force control apparatus as recited in claim 1 wherein the percentage of the driving force modification quantity in relation to the grade resistance is decreased as the grade resistance increases.

4. The vehicle driving force control apparatus as recited in claim 1 wherein the control section comprises a target speed ratio determining section for determining a target speed ratio in accordance with the vehicle speed and the grade-adapted target driving force, the output section comprises a speed ratio achieving section for achieving the target speed ratio, the control section further comprises a target engine output torque determining section for determining a target engine output torque by dividing the grade-adapted target driving force by an actual speed ratio achieved by the speed ratio achieving section, and the output section comprises a torque achieving section for achieving the target engine output torque.

5. The vehicle driving force control apparatus as recited in claim 1 wherein the input section comprises a position sensing subsection for determining an absolute vehicle position of the vehicle, and the grade resistance determining section of the control section comprises a road map section for supplying information on a road grade from road map data in accordance with the vehicle position, and a grade calculating section for calculating the grade resistance from the information on the road grade.

6. The vehicle driving force control apparatus as recited in claim 1 wherein the grade resistance determining section comprises an axle torque calculating section for calculating an axle torque, a reference running resistance calculating section for calculating a desired running resistance on a level road corresponding to the vehicle speed as a reference running resistance, an acceleration determining section for determining a vehicle acceleration, an acceleration resistance estimating section for determining an estimated acceleration resistance in accordance with the vehicle acceleration, and a vehicle grade resistance estimating section for determining the vehicle grade resistance by subtracting the reference running resistance and the acceleration resistance from the axle torque.

7. The vehicle driving force controlling apparatus as claimed in claim 4 wherein the torque achieving section of the output section comprises an engine, the speed ratio achieving section comprises a transmission, and said apparatus is a motor vehicle.

8. An apparatus for controlling a vehicle driving force comprising:

an input section for sensing a driver's accelerator input quantity and a vehicle speed of a vehicle;

an output section for varying an actual vehicle driving force; and a control section connected with said input section to receive input information therefrom, to determine, as a normal target driving force, a desired vehicle driving force on a level road in accordance with the accelerator input quantity and the vehicle speed, further to determine a vehicle grade resistance, to calculate a modification parameter in accordance with the vehicle grade resistance, and to determine a grade-adapted target driving force in accordance with the normal driving force and the modification parameter, the controller being further connected with said output section to achieve the grade-adapted target driving force with the output section;

wherein the input section comprises an accelerator input quantity sensing section for sensing the accelerator input quantity, and a vehicle speed sensing section for sensing the vehicle speed; and wherein the control section comprises a normal driving force determining section for determining, as the normal driving force, the desired vehicle driving force on the level road in accordance with the accelerator input quantity and the vehicle speed, a vehicle weight grade resistance determining section for determining the vehicle grade resistance, a modification parameter calculating section for calculating the modification parameter in accordance with the grade resistance, and a grade-adapted target driving force calculating section for determining the grade-adapted target driving force in accordance with the normal driving force and the modification parameter;

wherein the modification parameter calculating section comprises a grade adapted reference driving force setting section for calculating a grade-adapted reference driving force which is a sum of the normal driving force and a predetermined percent of a predetermined standard grade resistance, the predetermined percent being smaller than 100%, and an interpolation coefficient calculating section for calculating an interpolation coefficient in accordance with the vehicle grade resistance and the standard grade resistance; and wherein the grade-adapted target driving force calculating section determines the grade-adapted target driving force by interpolation with the interpolation coefficient between the normal driving force and the grade-adapted reference driving force.

9. The vehicle driving force control apparatus as recited in claim 8 wherein the control section comprises a target speed ratio determining section for determining a target speed ratio in accordance with the vehicle speed and the grade-adapted target driving force, the output section comprises a speed ratio achieving section for achieving the target speed ratio, the control section further comprises a target engine output torque determining section for determining a target engine output torque by dividing the grade-adapted target driving force by an actual speed ratio achieved by the speed ratio achieving section, and the output section comprises a torque achieving section for achieving the target engine output torque.

10. The vehicle driving force control apparatus as recited in claim 8 wherein the input section comprises a position sensing subsection for determining an absolute vehicle position of the vehicle, and the grade resistance determining section of the control section comprises a road map section for supplying information on a road grade from road map data in accordance with the vehicle position, and a grade calculating section for calculating the grade resistance from the information on the road grade.

11. The vehicle driving force control apparatus as recited in claim 8 wherein the grade resistance determining section comprises an axle torque calculating section for calculating an axle torque, a reference running resistance calculating section for calculating a desired running resistance on a level road corresponding to the vehicle speed as a reference running resistance, an acceleration determining section for determining a vehicle acceleration, an acceleration resistance estimating section for determining an estimated acceleration resistance in accordance with the vehicle acceleration, and a vehicle grade resistance estimating section for determining the vehicle grade resistance by subtracting the reference running resistance and the acceleration resistance from the axle torque.

12. A vehicle comprising:

an output section comprising a prime mover for varying an actual driving force of the vehicle;

an input section for collecting input information on vehicle operating conditions of the vehicle, said input section comprising a vehicle speed sensor for sensing a vehicle speed of the vehicle, and an accelerator sensor for sensing a driver's accelerator input quantity; and a control section comprising a controller for determining, as a normal target driving force, a desired vehicle driving force on a level road in accordance with the accelerator input quantity and the vehicle speed, for determining a vehicle grade resistance in accordance with the input information, for calculating a driving force modification quantity in accordance with the vehicle grade resistance, for determining a grade-adapted target driving force which is equal to a sum of the driving force modification quantity and the normal target driving force, and for achieving the grade-adapted target driving force by regulating the output section, wherein the controller is configured to calculate the driving force modification quantity by multiplying the grade resistance by a predetermined factor which is greater than zero and smaller than one, and to calculate the grade-adapted target driving force by adding the driving force modification quantity to the normal driving force.

13. A vehicle comprising:

an output section comprising a prime mover for varying an actual driving force of the vehicle;

an input section for collecting input information on vehicle operating conditions of the vehicle, said input section comprising a vehicle speed sensor for sensing a vehicle speed of the vehicle, and an accelerator sensor for sensing a driver's accelerator input quantity; and a control section comprising a controller for determining, as a normal target driving force, a desired vehicle driving force on a level road in accordance with the accelerator input quantity and the vehicle speed, for determining a vehicle grade resistance in accordance with the input information, for calculating a driving force modification quantity in accordance with the vehicle grade resistance, for determining a grade-adapted target driving force which is equal to a sum of the driving force modification quantity and the normal target driving force, and for achieving the grade-adapted target driving force by regulating the output section wherein the controller is configured to calculate a grade-adapted reference driving force which is a sum of the normal driving force and a predetermined standard grade resistance multiplied by a predetermined factor which is greater than zero and smaller than one, to calculate an interpolation coefficient in accordance with the vehicle grade resistance and the standard grade resistance, and to calculate the grade-adapted target driving force by adding, to the normal driving force, the driving force modification quantity which is equal to a product of the interpolation coefficient and a difference resulting from subtraction of the normal driving force from the grade-adapted reference driving force.

14. The vehicle as recited in Claim 12 wherein the input section further comprises a vehicle condition sensor for sensing a vehicle operating condition, the controller determines the vehicle grade resistance in accordance with the vehicle operating condition, the controller comprises an onboard computer, the prime mover includes an engine of the vehicle, the output section further comprises a transmission connected with the engine, and the controller achieves the grade-adapted target driving force by controlling the engine and the transmission.

15. A vehicle driving force controlling apparatus comprising:

means for ascertaining an accelerator input quantity and a vehicle speed;

means for determining, as a normal target driving force, a desired vehicle driving force on a level road in accordance with the accelerator input quantity and the vehicle speed;

means for determining a vehicle grade resistance means for calculating a driving force modification quantity in accordance with the grade resistance and for setting the driving force modification quantity at less than 100% of the grade resistance;

means for determining a grade-adapted target driving force which is a sum of the normal driving force and the driving force modification driving; and means for achieving the grade-adapted target driving force.

16. A process for controlling a vehicle driving force of a vehicle, said process comprising:

determining a normal driving force representing a desired vehicle driving force on a level road, in accordance with an accelerator input quantity and a vehicle speed;

calculating a driving force modification quantity in accordance with a vehicle grade resistance, wherein the driving force modification quantity is set at less than 100% of the grade resistance; and determining a grade-adapted target driving force which is a sum of the normal driving force and the driving force modification quantity, to control the vehicle driving force.

17. The process as recited in claim 16 wherein the process is a computer-implemented process, and the process further comprises collecting input information on sensed vehicle operating conditions, determining the grade resistance in accordance with the input information, and achieving the grade-adapted target driving force in the vehicle by controlling engine and transmission of the vehicle.

* * * * *